United States Patent [19]
Liu

[11] Patent Number: 5,518,458
[45] Date of Patent: May 21, 1996

[54] TENSION DEVICE FOR CHAIN OF BICYCLE

[76] Inventor: Robert Z. Liu, No. 9 Alley 62, lane 168, Feng-Dong Road, Feng-Yuan City, Taichung County, Taiwan

[21] Appl. No.: 383,981

[22] Filed: Feb. 6, 1995

[51] Int. Cl.⁶ ............................................. F16H 7/08
[52] U.S. Cl. ......................................................... 474/111
[58] Field of Search .................................... 474/101, 111, 474/136, 78–81

[56] References Cited

U.S. PATENT DOCUMENTS 4,861,321  8/1989  Siegwart, Jr. ....................... 474/111 X
4,919,644  4/1990  Carlyle ..................................... 474/80
5,013,285  5/1991  Carlyle ..................................... 474/80

Primary Examiner—Michael Powell Buiz
Attorney, Agent, or Firm—Head, Johnson & Kachigian

[57] ABSTRACT

A tension device is secured to a bicycle for tensioning the chain of the bicycle. The device includes a coupler having two jaw members defining a space for coupling to the bicycle. A bracket is rotatably secured to the coupler and includes a pair of lugs for rotatably supporting a sprocket. The sprocket is rotatably supported between the lugs and engaged with the chain so as to tension the chain. The sprocket and the bracket are rotatable relative to the coupler for suitably supporting the chain in place.

3 Claims, 3 Drawing Sheets

5,518,458

TENSION DEVICE FOR CHAIN OF BICYCLE

BACKGROUND OF THE INVENTION

1. Field of the Invention

The present invention relates to a tension device, and more particularly to a tension device for tensioning the chain of bicycles.

2. Description of the Prior Art

Typical chains are rotatably coupled between two sprocket wheels. For multi-speed bicycles, a tension pulley and a guide pulley are provided for tensioning the chain of the bicycle. However, for single-speed bicycles, no tensioning means are provided for tensioning the chain such that the chain may become loose after usage.

The present invention has arisen to mitigate and/or obviate the afore-described disadvantages of the conventional chains.

SUMMARY OF THE INVENTION

The primary objective of the present invention is to provide a tension device for tensioning the chain of bicycles.

In accordance with one aspect of the invention, there is provided a tension device for tensioning chain of bicycle comprising a coupler including two jaw members having an upper portion pivotally coupled together and having a lower portion secured together, the jaw members defining a space therein and being provided for coupling to the bicycle, a bracket rotatably secured to the coupler and including a pair of lugs, and a sprocket rotatably supported between the lugs and provided for engaging with the chain so as to tension the chain. Both the sprocket and the bracket are rotatable relative to the coupler for suitably supporting the chain in place.

A pair of curved packings are received in the space for engaging between the bicycle and the jaw members. A resilient pad is engaged in the sprocket for preventing the chain from scraping the sprocket.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
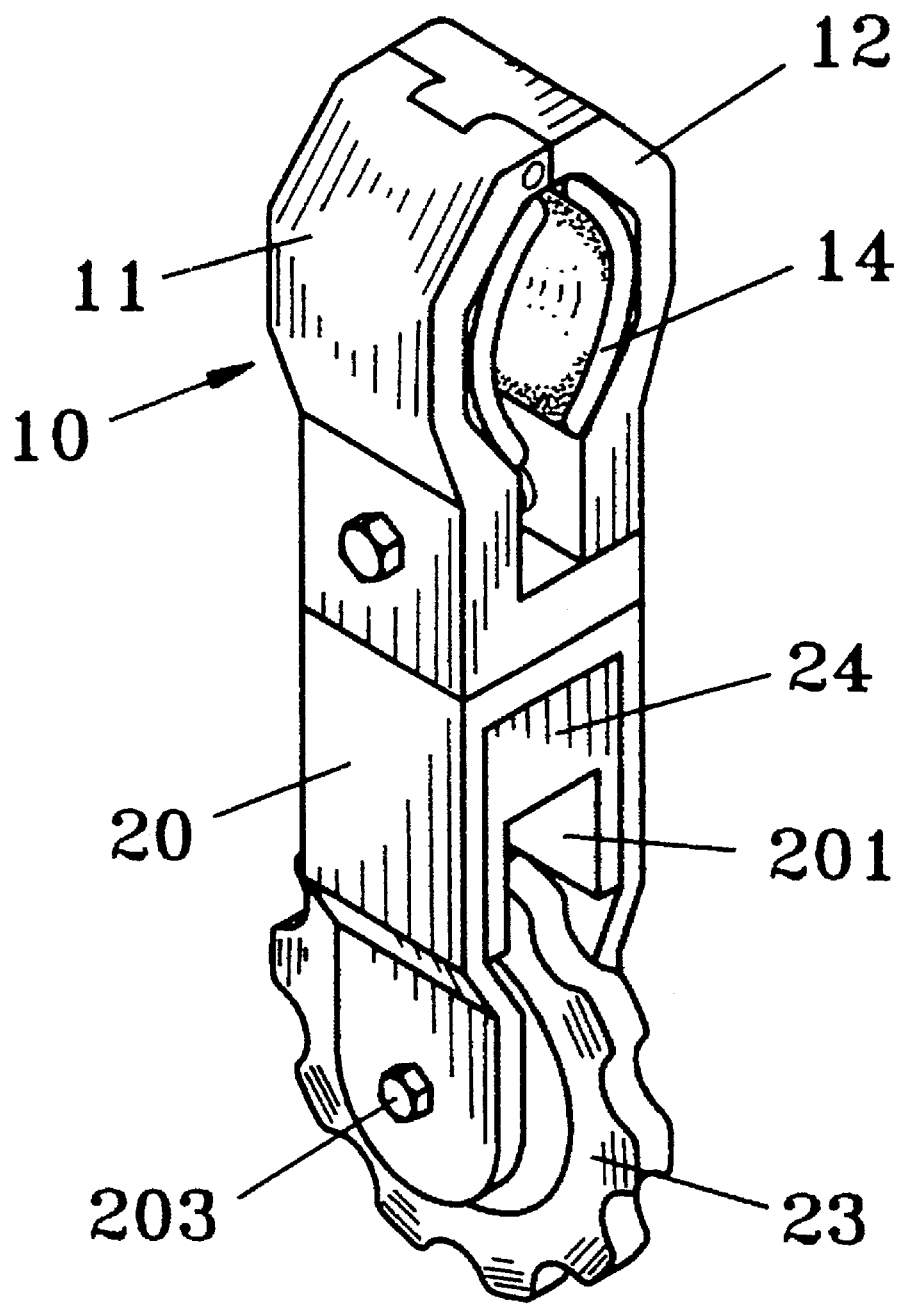
FIG. 1 is a perspective view of a tension device in accordance with the present invention.
Figure 2:
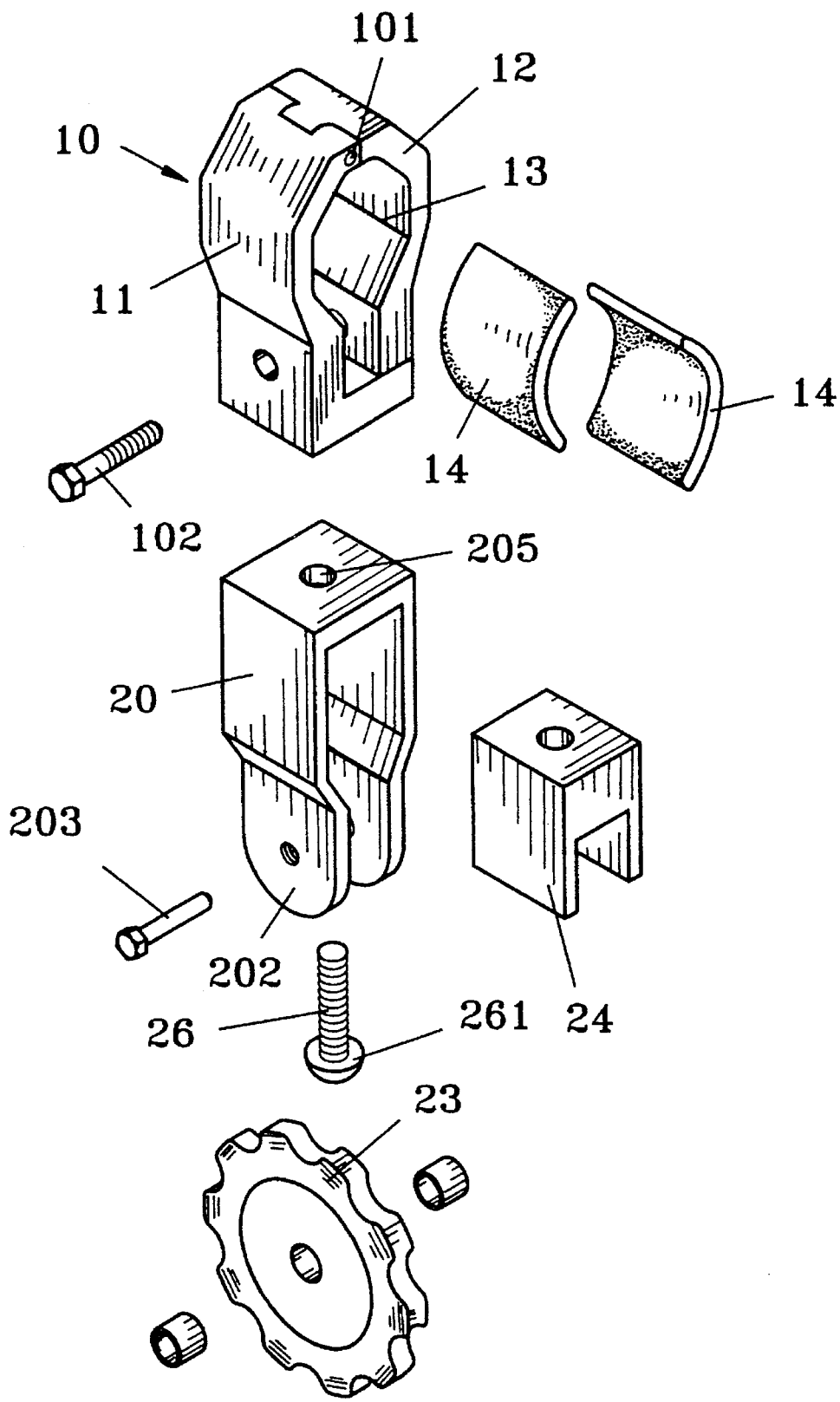
FIG. 2 is an exploded view of the tension device.

Referring to the drawings, and initially to FIGS. 1 and 2, a tension device in accordance with the present invention is provided for tensioning the chains of bicycles and comprises a coupler 10 including a pair of jaw members 11, 12 defining a space 13 therein for engaging with bicycle frame. A pair of curved packings 14 are engaged within the space 13 and engaged between the bicycle frame and the jaw members 11, 12 for protecting the same. The jaw members 11, 12 include an upper portion pivotally coupled together at a pivot pin 101 and include a lower portion secured together by bolt 102.

Figure 3:
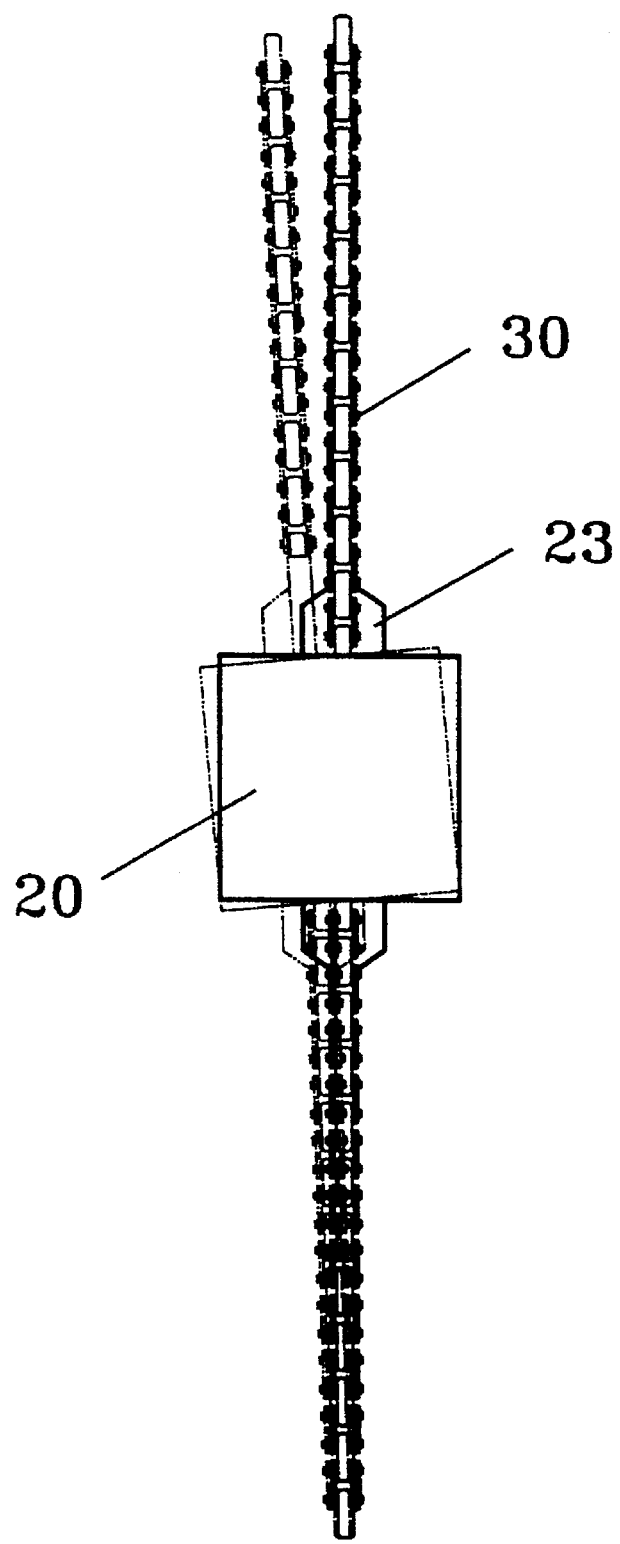
FIG. 3 is a schematic view illustrating the operation of the tension device.

A bracket 20 includes an opening 201 formed therein for engaging with a resilient pad 24 and includes a pair of lugs 202 having a shaft 203 secured therebetween. A gear or a sprocket 23 is rotatably supported on the shaft 203 for engaging with and for tensioning the chain 30 (FIG. 3). A bolt 26 is engaged through a hole 205 formed in top of the bracket 20 and is engaged with the coupler 10 so as to rotatably secure the bracket 20 to the coupler 10. The bolt 26 includes a head 261 for engaging with the bracket 20 so as to rotatably support the bracket 20 in place; such that both the bracket 20 and the sprocket 23 may rotate relative to the coupler 10 about the bolt 26. The resilient pad 24 is provided for preventing the chain 30 from damaging or scraping the bracket 20.

In operation, as shown in FIG. 3, the sprocket 23 may engage with the chain 30 so as to tension the chain 30. When the chain 30 is laterally moved between the sprockets of the multi-speed sprocket wheel assembly of the bicycle, both the sprocket 23 and the housing 20 may rotate about the bolt 26 according to the movement of the chain such that the chain 30 may be maintained in a substantially straight configuration.

Accordingly, the tension device in accordance with the present invention includes a sprocket for engaging with the chain and for rotating relative to the coupler so as to suitably retain the chain in suitable position.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tension device for tensioning chain of bicycle comprising:

a coupler including two jaw members having an upper portion pivotally coupled together and having a lower portion secured together, said jaw members defining a space therein and being provided for coupling to said bicycle, a bracket rotatably secured to said coupler and including a pair of lugs, and a sprocket rotatably supported between said lugs and provided for engaging with said chain so as to tension said chain, said sprocket and said bracket being rotatable relative to said coupler for suitably supporting said chain in place.

2. A tension device according to claim 1 further comprising a pair of curved packings received in said space for engaging between said bicycle and said jaw members.

3. A tension device according to claim 1 further comprising a resilient pad engaged in said sprocket for preventing said chain from scraping said sprocket.

\* \* \* \* \*